Oct. 17, 1967  F. PLAGMANN  3,347,214
ANGULAR JOINT ARRANGEMENT
Filed Jan. 14, 1966  2 Sheets-Sheet 1

Inventor:
Frank Plagmann
by Michael S. Striker
Atty

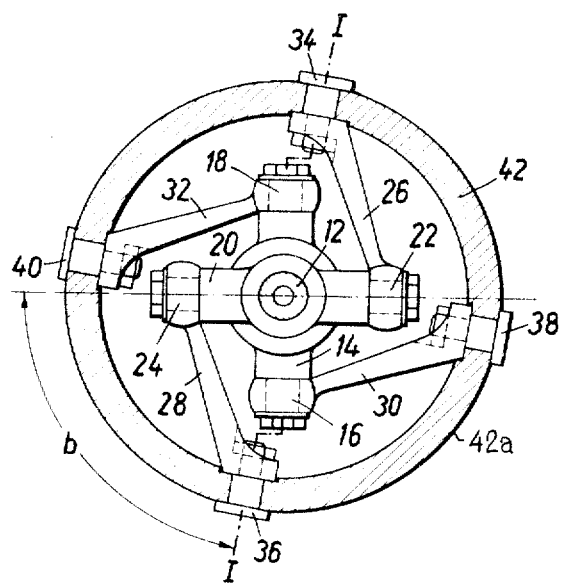
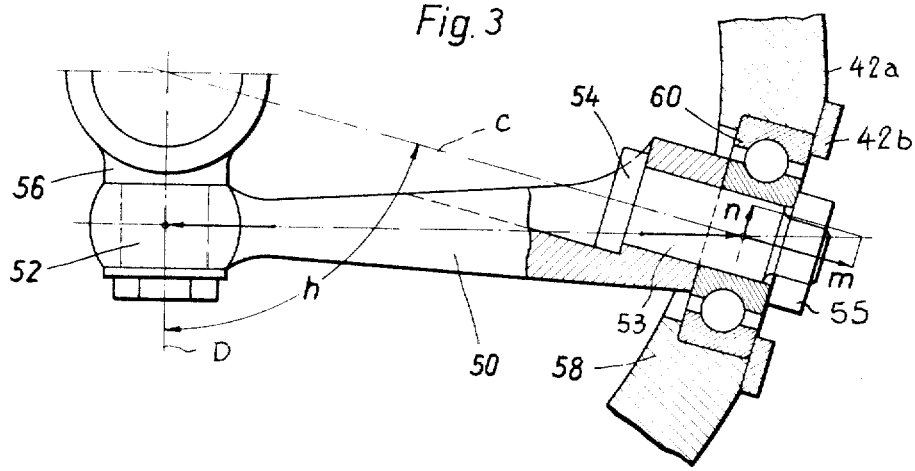

United States Patent Office 3,347,214
Patented Oct. 17, 1967

3,347,214
ANGULAR JOINT ARRANGEMENT
Franz Plagmann, Hamburg, Germany, assignor to Motoren Versuchsgesellschaft Witten mbH. & Co. KG., Hamburg, Germany
Filed Jan. 14, 1966, Ser. No. 520,796
Claims priority, application Germany, Jan. 20, 1965, P 35,908
10 Claims. (Cl. 123—11)

The present invention relates to an angular joint arrangement, and more particularly to a joint for transmitting the torque of at least two coaxial drive shafts to an output shaft whose axis is inclined to the common axis of the drive shafts.

In combustion engines of the rotary vane type, vane means are carried by coaxial shafts and drive the same. The torque is transmitted to an output shaft which is slanted to the axis of the vanes. In accordance with the prior art, the drive shafts are connected with the driven output shaft by offset universal joints which have to transmit the high torque produced by high combustion pressures. Consequently, the universal joints have to be very strong and heavy so that at high rotary speeds, great acceleration and deceleration forces develop which cause detrimental oscillations in the shaft. Furthermore, since the acceleration forces are different for the masses of the inner and outer cross joints, counterbalancing weights have to be provided particularly at the inner cross joints for obtaining a substantially smooth and quiet running of the joint connection.

Another disadvantage of universal joints is that different parts are required for the joints which are expensive to manufacture and difficult to assemble. The joints have to include annular members, which cannot be replaced by connecting links, since this would cause not only a tangential, but also a radial stress of the joint arms, requiring a stronger and heavier construction of the same, causing additional problems.

For angles of substantially 60° between drive shaft and driven shaft, several universal joints have been used, each of which is constructed for a greater angle. However, due to the greater number of joints, the construction is not economical. Finally, the known constructions are incapable of transmitting the torque of more than two concentric drive shafts to a driven shaft extending at an angle to the same. Such a shaft and joint construction is particularly required for modern rotary vane motors or compressors.

It is one object of the invention to overcome the disadvantages of known joint constructions, and to provide an annular joint arrangement particularly suited for connecting a plurality of coaxial drive shafts with a driven output shaft extending at an angle to the same.

Another object of the invention is to provide an angular joint arrangement of extremely simple construction and light weight for connecting at least two coaxial rotary means having a common axis with a third rotary means having an axis slanted to the first mentioned axis.

Another object of the invention is to provide an angular joint without gimbal rings.

Another object of the invention is to provide an angular joint which is particularly suited for transmitting the torque of a rotary vane machine to a shaft extending at an angle to the axis of rotation of the machine.

With these objects in view, the present invention relates to an angular joint arrangement which is advantageously used for transmitting the torque produced by a plurality of vanes in rotary combustion engines.

One embodiment of the invention comprises first and second rotary means, such as coaxial shafts, having a common first main axis; third rotary means, such as another shaft, having a second main axis intersecting the first main axis at a point of intersection; first pivot means, preferably including two first pivots mounted on the first rotary means and having a first pivot axis; second pivot means, preferably including two second pivots mounted on the second rotary means and having a second pivot axis; a plurality of third pivot means, preferably each including two third pivots mounted on the third rotary means and respectively having third pivot axes; and a plurality of connecting means, such as connecting links respectively connecting one of the third pivot means with the first and second pivot means respectively. The first, second and third pivot axes all extend through the point of intersection of the first and second main axes.

Preferably, the first and second pivot axes are perpendicular to each other, and the third pivot axes are perpendicular to each other.

Preferably, each third pivot axis defines an angle of less than 90° with the pivot axis of the respective first or second pivot means with which it is connected by the connecting means.

In the preferred embodiment of the invention, the first and second vane means of a rotary vane machine are respectively secured to first and second concentric shafts and drive through the joint arrangement of the invention, an output shaft provided with a flywheel. The third pivot means are mounted on the rim of the flywheel angularly spaced from each other so that the connecting links are at least partly located within the bell-shaped flywheel.

In the preferred embodiment of the invention, a crossbar is secured to the free end of each drive shaft and carries a pair of first pivots, or a pair of second pivots, respectively, at the ends thereof. Each drive shaft thus has at least one radially extending arm with a radial pivot on which the end of a connecting link is turnably mounted, whose other end is pivotally connected with the rim of the flywheel of the output shaft. The axes of all turning elements intersect at the same point.

It will be understood that the plurality of coaxial rotary means may serve as drive means for driving a single rotary output means, or that the arrangement may be reversed, and two coaxial shafts driven from a single drive shaft by means of the angular joint. In the first case, the rotary vane engine may be a combustion engine, and in the second case the rotary vane engine may be a compressor or pump.

In the joint construction of the invention, comparatively light connecting links are used for connecting the pivots so that the mass of joint is small and the inertia is low.

In the embodiment of the invention in which two coaxial shafts are used, the crossbars of the coaxial shafts are spaced angles of 90°. However, a greater number of coaxial shafts may be connected by the joint of the invention with another shaft and if, for example, three coaxial shafts are provided, namely a solid shaft and two hollow shafts, the crossbars on the shafts, and also the pivot axes of the pivots carried by the same, extend at angles of 60° to each other. Due to the fact that all connecting links can be alike, the joint can be economically manufactured, and a small number of spare parts is required.

A particularly compact construction of the joint is obtained, if the angle between the pivot axes at the ends of each connecting link, is smaller than 90°. The crossbars and the connecting links are in such a position as to take up little space without interferring with each other during the rotation, while all shearing forces act in axial direction.

A joint arrangement according to the invention is particularly easy to service and repair, since the connecting links are light and can be easily exchanged. Another advantage resides in that the connecting links are substantially stressed only in longitudinal direction, and are not exposed to substantial bending moments. Another advantage of the joint construction is that the angle between the input and output shaft means is variable within a wide range, without requiring any change of the joint, such as a replacement of the connecting links.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a cross sectional view taken on line II—II in FIG. 1; and

FIG. 3 is a fragmentary cross sectional view corresponding to FIG. 2, and illustrating a modified detail on an enlarged scale.

Figure 1:
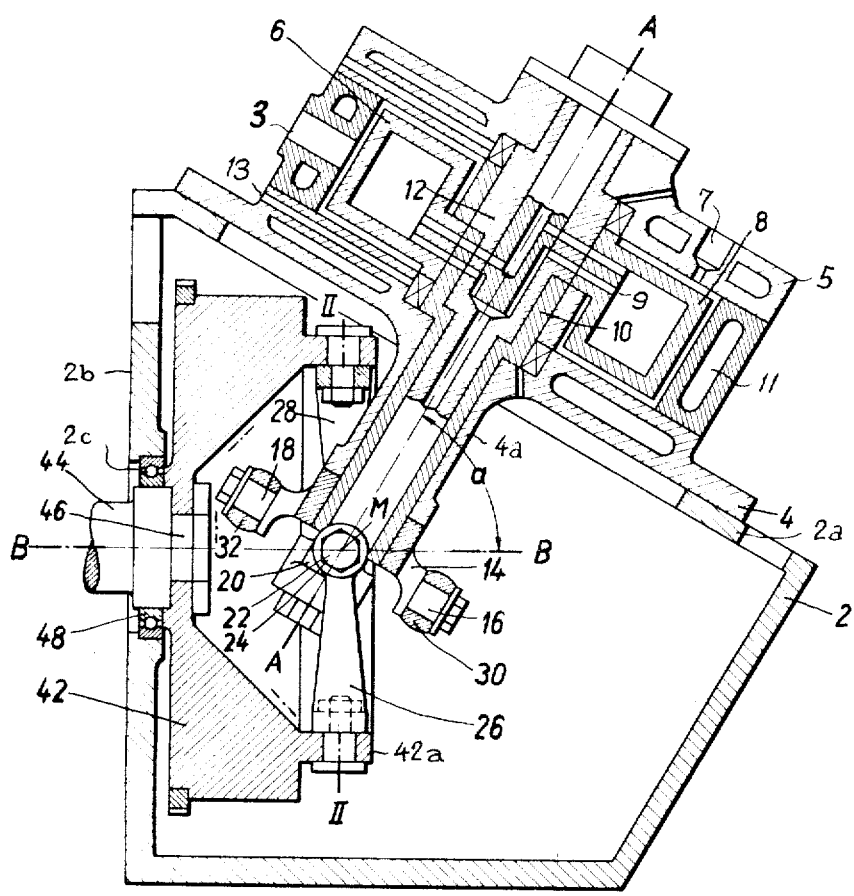
FIG. 1 is an axial sectional view illustrating an angular joint arrangement according to one embodiment of the invention applied to a rotary vane machine.

Referring now to the drawings, a rotary vane combustion engine 4 is mounted on a slanted wall 2a of a housing 2 which has a vertical wall 2b provided with a ball bearing 2c in which an output shaft 44 is mounted for rotation about a main axis B—B. The rotary vane motor is of a known construction, and not an object of the invention. The illustrated vane motor has first vane means 6 secured to a first hollow shaft 10, and second vane means 8 secured to a shaft 12 partially located within the hollow shaft 10 and being coaxial with the same. Shaft 10 with vane means 6 and shaft 12 with vane means 8 constitute first and second rotary means which have a common axis of rotation A—A extending at an angle $a$ to the second main axis B—B.

The vane means 6 and 8 rotate at varying speeds, each vane means rotating faster while the other rotates slower during each revolution so that the vanes angularly approach each other to compress fuel admitted through inlet 3 and then again move away from each other during combustion of the fuel. Consequently, the first and second rotary means 10, 6 and 12, 8 rotate at varying rotary speeds.

The joint arrangement of the invention transmits the rotary motions of both rotary means to a single output shaft 44.

Channels 9 in vane means 6 and 8 communicate through channels in the shafts 10 and 12 with a center bore in a member 4' through which a coolant is supplied to the vane means. The coolant is also circulated through passage 11 in the casing. Lubricating oil is admitted through ducts 13.

Shaft 10 is mounted for rotation in a tubular portion 4a of the vane motor which projects into housing 2. A crosspiece 14 is secured to the free end of shaft 10, and another crosspiece 20 is secured to the free end of shaft 12 which projects from the end of shaft 10. Crosspieces 14 and 20 extend at right angles to each other.

Crosspiece 14 has a pair of first pivots 16 and 18 at the ends thereof, and crosspiece 20 has a pair of second pivots 22, 24 at the ends thereof. Pivots 16, 18 are a first pivot means defining a first pivot axis, and pivots 22, 24 are a second pivot means defining a second pivot axis. The first and second pivot axes are located in a common plane perpendicular to the main axis A—A, and intersect each other in the point of intersection M of the two main axes A—A and B—B. Consequently, the first and second pivots 16, 18, 22, 24 extend in radial direction with respect to main axis A—A.

A bell-shaped or dished flywheel 42 is secured by a screw 46 to shaft 44 and forms with the same a third rotary means rotatable about the main axis B—B. Flywheel 42 has an annular rim or portion 42a supporting two pairs of third pivots 34, 36 and 38, 40. Pivots 38, 40 are diametrically arranged and constitute a third pivot means having a third pivot axis passing through the point of intersection M. Pivots 34, 36 are also diametrically arranged and constitute another third pivot means with a third pivot axis passing through the point of intersection M, and being perpendicular to the third pivot axis defined by pivots 38, 40. None of the third pivot axes coincides with a first or second pivot axis.

First pivot 16 is connected with third pivot 38 by connecting link 30 which has bearings receiving the pivots at the ends thereof. The other third pivot 18 is connected by a connecting link to third pivot 40. Second pivot 20 is connected by a connecting link 28 to third pivot 36, and second pivot 22 is connected by a connecting link 26 to third pivot 34. All connecting links are alike. Nuts at the ends of the pivots retain the bearing ends of the connecting links on the respective pivots. FIGS. 1 and 2 illustrate the construction somewhat schematically, and the construction of the third pivot shown in FIG. 3 is preferred.

As shown in FIG. 3, a first or second pivot 52 is provided on a crosspiece 56 and supports one end of a connecting link 50. The other end of connecting link 50 carries the inner race of a ball bearing 60 whose outer race is secured to the rim 42a of the flywheel. A ring 42b secures the ball bearing to the rim 42a, while a nut 55 on a thread portion of a bolt 53 abuts the inner race and urges the head 54 of bolt 53 against an abutment face on connecting link 50.

The third pivot axis C defined by bolt 53 and ball bearing 60, defines an angle $h$ smaller than 90° with the first or second pivot axis D. As clearly shown in FIG. 2, the first pivot axis defined by pivots 16 and 18 defines an angle smaller than 90° with the third pivot axis defined by third pivots 38 and 40, and the second pivot axis defined by pivots 20 and 22 forms an angle smaller than 90° with the third pivot axis defined by the third pivots 34, 36.

As best seen in FIG. 3, the shearing and tensile forces passing longitudinally through a connecting link 50, act in radial direction on a first or second pivot 52, as is desirable, while the force is divided into two components $m$ and $n$, of which the component $m$ acting in the direction of the third pivot axis and of pivot 53, is substantially greater than the component $n$.

In order to obtain a smooth, uniform and quiet running of the joint arrangement while the connecting links 26 to 32 transmit the forces substantially only in longitudinal direction thereof, the third pivots 34, 36, 38 and 40, and the first and second pivots 13, 18, 22, 24, all have pivot axes extending in radial direction through the point of intersection M of the two main axes.

While in the embodiment of FIGS. 1 and 2, a pair of concentric shaftss 10 and 12 having crosspieces 14 and 20 extending at right angles is illustrated, it will be understood that three or more concentric shafts can be provided, in which event the crossbars would be spaced at different angles, for example at angles of 60°. Such a construction would require six connecting links.

Due to the fact that the angle $h$ between the pivot axes C and D as shown in FIG. 3, is smaller than 90°, the connecting links can be made short and very light, while the buckling forces extend in longitudinal direction thereof. Furthermore, the maximum speed of the vane means 6 and 8 is advanced in the operational cycle in such a manner that the time of the greatest acceleration of the vanes is in the best possible ratio to the highest ignition pressure whereby the load acting on the connecting links and pivots is reduced.

It will be understood that each of the elements described above, or two or more together, may also find a useful application in other types of angular joint arrangements differing from the types described above.

While the invention has been illustrated and described as embodied in an angular joint for connecting a plurality of coaxial shafts with another shaft, it is not intended to be limited to the details shown, since various modifications and structural changes may be made without departing any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Angular joint arrangement comprising, in combination, at least first and second rotary means having a common first main axis of rotation; third rotary means having a second main axis of rotation, said first and second axes being located in a plane slanted to each other and having a point of intersection; first pivot means mounted on said first rotary means and having a first pivot axis; second pivot means mounted on said second rotary means and having a second pivot axis, said first and second pivot axes extending through said point of intersection; a plurality of third pivot means mounted on said third rotary means angularly spaced about said second main axis and respectively having third pivot axes extending through said point of intersection; and a plurality of connecting means respectively connecting one of said third pivot means with said first and second pivot means, respectively, whereby said first and second rotary means are connected with said third rotary means for rotation.

2. Angular joint arrangement according to claim 1, wherein said first and second pivot axes are located in a common plane perpendicular to said first main axis; and wherein said third pivot axes are located in a plane perpendicular to said second main axis.

3. Angular joint arrangement according to claim 1, wherein said first and second pivot axes are perpendicular to each other; and wherein said third pivot axes are perpendicular to each other.

4. Angular joint arrangement according to claim 1 wherein said first rotary means include first vane means of a rotary combustion engine, and a hollow first shaft carrying said first vane means; wherein said second rotary means include a second shaft located in said hollow first shaft, and second vane means carried by said second shaft; and wherein said third rotary means include an output shaft driven by said first and second shafts.

5. Angular joint arrangement according to claim 1, wherein said first pivot means include a pair of first pivots diametrically spaced about said first main axis coaxial with said first pivot axis; wherein said second pivot means include two second pivots diametrically spaced about said first main axis coaxial with said second pivot axis; wherein each of said third pivot means include a pair of third pivots diametrically spaced about said second main axis coaxial with the respective third pivot axis; and wherein each connecting means includes two connecting members respectively connecting a third pivot with one of said first pivots or one of said second pivots.

6. Angular joint arrangement according to claim 5, wherein said first rotary means include a hollow first shaft having said first pivots at the ends thereof; and wherein said second rotary means includes a second shaft located in said hollow first shaft, and a cross bar at the end of said second shaft having said second pivots at the ends thereof.

7. Angular joint arrangement according to claim 1 wherein each third pivot axis defines an angle of less than 90° with the pivot axis of the respective first or second pivot means with which it is connected by said connecting means.

8. Angular joint arrangement according to claim 1, wherein said first pivot means include a pair of first pivots diametrically spaced about said first main axis coaxial with said first pivot axis; wherein said second pivot means include two second pivots diametrically spaced about said first main axis coaxial with said second pivot axis; wherein each of said third pivot means include a pair of third pivots diametrically spaced about said second main axis coaxial with the respective third pivot axis; wherein said connecting means includes two connecting members respectively connecting a third pivot with one of said first pivots or one of said second pivots, all said connecting members of said connecting means being alike; and wherein said third pivot axis of each pair of third pivots defines an angle of less than 90° with the pivot axis of the respective first or second pivot with which it is connected.

9. Angular joint arrangement according to claim 1 wherein said third rotary means include a shaft and a bell-shaped flywheel secured to said shaft coaxial therewith, said bell-shaped flywheel having an annular rim; wherein said third pivot means are mounted on said rim angularly spaced from each other; and wherein said connecting means are at least partially located within said bell-shaped flywheel.

10. Angular joint arrangement according to claim 1 wherein said first rotary means include a hollow first shaft and a first crossbar at the end of the same; wherein said second rotary means include a second shaft located in said first shaft and having a second crossbar at the end located adjacent said first crossbar, said crossbars being located in planes perpendicular to said first main axis; wherein said first pivot means include a pair of first pivots at the ends of said first crossbar; wherein said second pivot means include a pair of second pivots at the ends of said second crossbar; wherein each of said third pivot means includes a pair of third pivots diametrically spaced about said second main axis; wherein each connecting means includes two connecting links having bearings for said pivots at the ends thereof, each connecting link connecting a third pivot with one of said first pivots or one of said second pivots; wherein each third pivot axis of a pair of third pivots defines an angle of less than 90° with the pivot axis of the respective first or second pivot with which it is connected by one of said connecting links; and wherein said third rotary means has an annular portion at least partly surrounding said connecting links and supporting said third pivots angularly spaced from each other.

References Cited

UNITED STATES PATENTS

| 1,242,906 | 10/1917 | Augustine | 64—19 |
| 2,253,445 | 8/1941 | Shufeldt | 123—11 |
| 3,139,871 | 7/1964 | Corset | 123—11 X |

FOREIGN PATENTS

| 1,305,810 | 8/1962 | France. |

RALPH D. BLAKESLEE, *Primary Examiner.*